United States Patent
Hirakata

(10) Patent No.: US 9,721,083 B2
(45) Date of Patent: Aug. 1, 2017

(54) INFORMATION PROCESSING APPARATUS AND INFORMATION MANAGEMENT METHOD

(71) Applicant: Satoru Hirakata, Kanagawa (JP)

(72) Inventor: Satoru Hirakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 65 days.

(21) Appl. No.: 14/558,936

(22) Filed: Dec. 3, 2014

(65) Prior Publication Data

US 2015/0161407 A1    Jun. 11, 2015

(30) Foreign Application Priority Data

Dec. 6, 2013 (JP) .................................. 2013-253154
Nov. 28, 2014 (JP) .................................. 2014-240835

(51) Int. Cl.
G06F 21/41    (2013.01)
G06F 21/31    (2013.01)
G06F 21/84    (2013.01)

(52) U.S. Cl.
CPC .............. *G06F 21/41* (2013.01); *G06F 21/31* (2013.01); *G06F 21/84* (2013.01); *G06F 2221/2149* (2013.01)

(58) Field of Classification Search
CPC .......... G06F 21/41; G06F 21/31; G06F 21/84; G06F 2221/2149
See application file for complete search history.

(56) References Cited

U.S. PATENT DOCUMENTS

| 5,343,529 A * | 8/1994 | Goldfine | G06F 21/31 340/5.5 |
| 8,056,120 B2 * | 11/2011 | Kusakari | G06F 21/31 726/16 |
| 8,756,670 B2 * | 6/2014 | Asano | G06F 21/41 726/5 |

(Continued)

FOREIGN PATENT DOCUMENTS

JP    2006-338213    12/2006
JP    2011-003187    1/2011

*Primary Examiner* — Joseph P Hirl
*Assistant Examiner* — J. Brant Murphy
(74) *Attorney, Agent, or Firm* — IPUSA, PLLC

(57) ABSTRACT

An information processing apparatus for managing information stored in a storage location includes an authentication management unit that manages first authentication information and second authentication information in association with each other, a storage location monitor unit, and an information management unit. The first authentication information is used to authenticate a user operating an operation terminal, and the second authentication information is used to prompt the storage location to authenticate the user. The storage location monitor unit monitors the information stored in the storage location using the second authentication information, and updates index information of the information stored in the storage location. The information management unit determines the storage location that can be used by the user based on the second authentication information associated with the first authentication information, creates a list of information that can be used by the user, and provides the list to the operation terminal.

12 Claims, 17 Drawing Sheets

(56) References Cited

U.S. PATENT DOCUMENTS

| | | | |
|---|---|---|---|
| 8,762,480 B2 * | 6/2014 | Park | G06F 17/30067 707/999.204 |
| 2005/0160297 A1 * | 7/2005 | Ogawa | H04L 63/083 726/19 |
| 2005/0216855 A1 * | 9/2005 | Kopra | G06F 17/3002 715/767 |
| 2007/0038860 A1 * | 2/2007 | Sawada | H04W 12/06 713/170 |
| 2007/0136293 A1 * | 6/2007 | Mizumukai | G06F 21/606 |
| 2008/0059962 A1 * | 3/2008 | Ito | H04N 1/00912 718/100 |
| 2008/0307514 A1 * | 12/2008 | Kusakari | G06F 21/31 726/7 |
| 2009/0024531 A1 * | 1/2009 | Yamahata | G06F 21/31 705/55 |
| 2009/0100515 A1 * | 4/2009 | Masui | G06F 21/629 726/16 |
| 2009/0112791 A1 * | 4/2009 | Nakagoshi | H04N 1/00411 |
| 2009/0296150 A1 * | 12/2009 | Shudo | H04N 1/00973 358/1.15 |
| 2010/0082741 A1 * | 4/2010 | Kawada | H04L 29/06 709/203 |
| 2010/0115608 A1 * | 5/2010 | Uchikawa | G06F 21/84 726/18 |
| 2010/0238481 A1 * | 9/2010 | Homma | G06F 21/629 358/1.14 |
| 2010/0325199 A1 * | 12/2010 | Park | G06F 17/30067 709/203 |
| 2012/0092710 A1 * | 4/2012 | Maeda | G06F 3/1207 358/1.15 |
| 2013/0219476 A1 * | 8/2013 | Lin | H04L 9/321 726/4 |
| 2013/0347098 A1 * | 12/2013 | Maeda | G06F 21/31 726/17 |
| 2014/0268208 A1 | 9/2014 | Hirakata | |
| 2014/0337928 A1 | 11/2014 | Hirakata et al. | |
| 2017/0094079 A1 * | 3/2017 | Watanabe | H04N 1/00344 |

* cited by examiner

FIG.6

| STORAGE SERVER AUTHENTICATION INFORMATION | | FILE SERVER AUTHENTICATION INFORMATION | | |
|---|---|---|---|---|
| USER ID | PASSWORD | FILE SERVER NAME | USER ID | PASSWORD |
| suzuki | ******** | FILE SERVER A | suzuki01 | ****** |
| | | FILE SERVER B | suzuki02 | ****** |
| | | FILE SERVER C | suzuki03 | ****** |
| tanaka | ******** | FILE SERVER A | tanaka01 | ****** |
| | | FILE SERVER B | tanaka02 | ****** |
| | | FILE SERVER C | tanaka03 | ****** |
| satoh | ******** | FILE SERVER A | satoh01 | ****** |
| | | FILE SERVER B | satoh02 | ****** |

FIG.9

| FILE SERVER NAME | FILE PATH | FULL-TEXT INFORMATION | UPDATE DATE/TIME | PERMISSION | OWNER | GROUP | FILE SIZE |
|---|---|---|---|---|---|---|---|
| FILE SERVER 20A | /userA/doc/invoice/ Printer Lease.doc | ○○ Inc. ・・・ | 2009/11/14 | -rw-r--r-- | userA | ri.co.jp | 33 |
| FILE SERVER 20B | /userC/doc/contract/ ○○ Trading Co.doc | ○○ Trading Co.・・・ | 2012/07/28 | -rw------- | userC | nts.ri.co.jp | 75 |
| ... | ... | ... | ... | ... | ... | ... | ... |
| OWN STORAGE | /userA/doc/xxx.doc | xxx・・・ | 2010/04/24 | -rw-r--r-- | userA | ri.co.jp | 21 |

FIG.17

| STORAGE SERVER AUTHENTICATION INFORMATION | | SERVER AUTHENTICATION INFORMATION | | |
|---|---|---|---|---|
| USER ID | PASSWORD | SERVER NAME | USER ID | PASSWORD |
| UserA | ****** | FILE SERVER A | Suzuki01 | ******** |
| | | FILE SERVER B | Suzuki02 | ******** |
| | | FILE SERVER C | Suzuki03 | ******** |
| | | CLOUD SERVICE B | Suzuki11 | ******** |
| UserB | ****** | FILE SERVER A | Tanaka01 | ******** |
| | | FILE SERVER C | Tanaka02 | ******** |
| | | CLOUD SERVICE A | Tanaka11 | ******** |
| | | CLOUD SERVICE B | Tanaka12 | ******** |
| UserC | ****** | FILE SERVER A | Satoh01 | ******** |
| | | FILE SERVER B | Satoh02 | ******** |
| | | CLOUD SERVICE C | Satoh11 | ******** |

INFORMATION PROCESSING APPARATUS AND INFORMATION MANAGEMENT METHOD

BACKGROUND OF THE INVENTION

1. Field of the Invention

The present invention relates to an information processing apparatus and an information management method.

2. Description of the Related Art

When a client receives a file access request from an application, the client may determine whether to process the request as a file access request to a local storage of the client or as a file access request to a cloud storage (see e.g. Japanese Laid-Open Patent Publication No. 2011-3187).

A user of a client device may store information such as a file in various storage locations including an external storage such as a file server. However, when the user wishes to use information stored in a storage, the user has to perform operations according to the storage in which the desired information is stored, thereby making operations for using stored information quite complicated.

SUMMARY OF THE INVENTION

An aspect of the present invention relates to providing an information processing apparatus and an information management method that can improve convenience for a user using information stored in a storage.

According to one embodiment of the present invention, an information processing apparatus for managing information stored in a storage location is provided. The information processing apparatus includes an authentication management unit configured to manage first authentication information and second authentication information in association with each other, a storage location monitor unit, and an information management unit. The first authentication information is used to authenticate a user operating an operation terminal, and the second authentication information is used to prompt the storage location to authenticate the user. The storage location monitor unit is configured to monitor the information stored in the storage location using the second authentication information, and update index information of the information stored in the storage location. The information management unit is configured to determine the storage location that can be used by the user operating the operation terminal that has been authenticated based on the first authentication information, the determination being made based on the second authentication information associated with the first authentication information. The information management unit is further configured to create a list of information that can be used by the user operating the operation terminal based on the determination, and provide the list to the operation terminal.

BRIEF DESCRIPTION OF THE DRAWINGS

FIG. 6 is a table illustrating an exemplary configuration of authentication information stored in an authentication information storage unit;

FIG. 9 is a table illustrating an exemplary configuration of index information;

FIG. 17 is a table illustrating another exemplary configuration of authentication information stored in the authentication information storage unit.

DETAILED DESCRIPTION OF THE PREFERRED EMBODIMENTS

In the following, certain embodiments of the present invention are described with reference to the accompanying drawings.

First Embodiment

<System Configuration>

Figure 1:
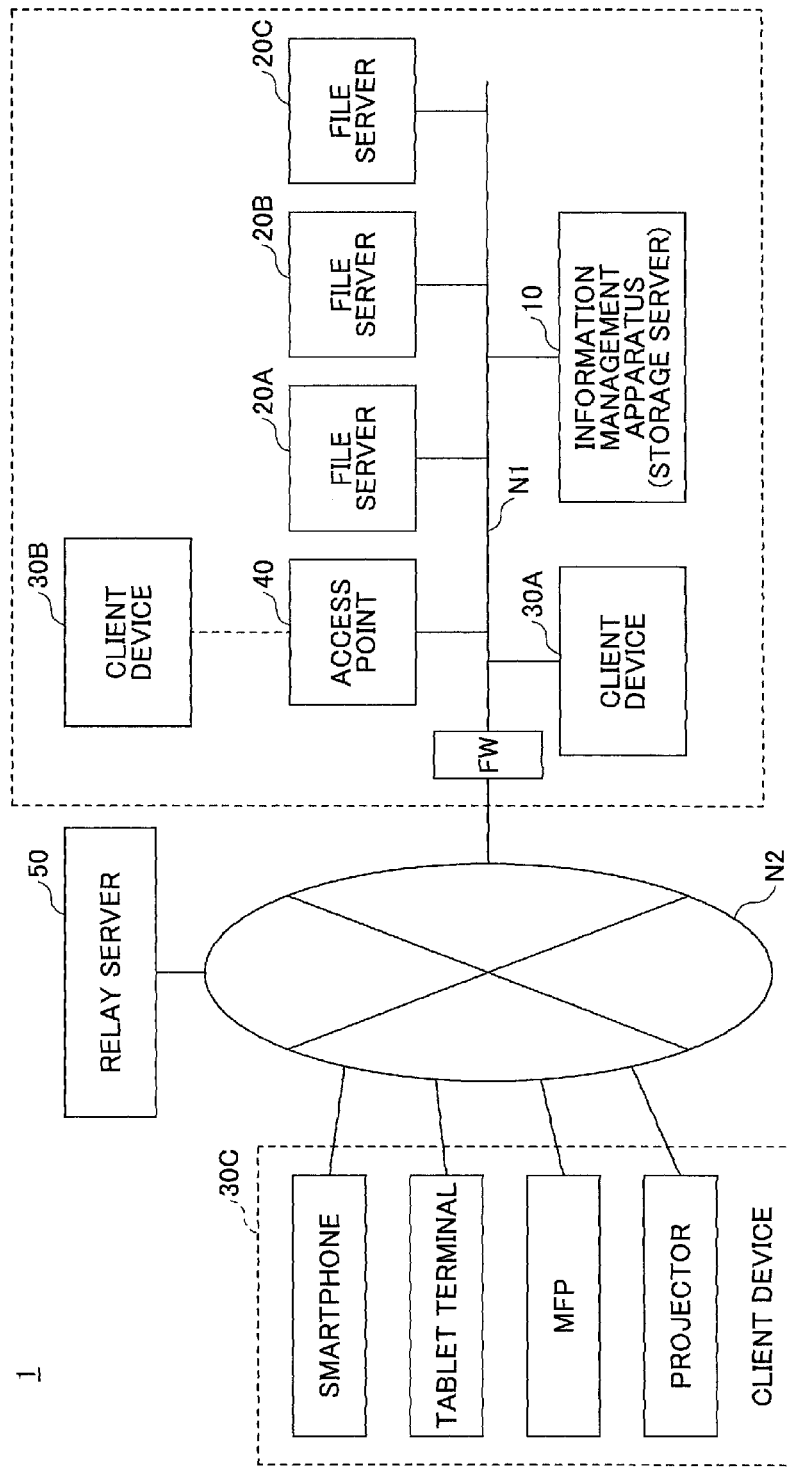
FIG. 1 illustrates an exemplary configuration of an information processing system according to an embodiment of the present invention.

FIG. 1 illustrates an exemplary configuration of an information processing system 1 according to an embodiment of the present invention. The information processing system 1 illustrated in FIG. 1 includes an information management apparatus (storage server) 10, file servers 20A-20C, client devices 30A-30C, an access point 40, and a relay server 50. The information management apparatus 10 is connected to the file servers 20A-20C and the client device 30A via a network N1 such as a LAN (Local Area Network). The information management apparatus 10 is connected to the client device 30B via the network N1 and the access point 40. Further, the information management apparatus 10 is connected to the client device 30C and the relay server 50 via the network N1 and a network N2 such as the Internet.

The file servers 20A-20C store information such as files. Note that the term "file server 20" may be used below to refer to any one of the file servers 20A-20C. The file server 20 may be a NAS (Network Attached Storage), for example.

The client devices 30A-30C may be operation terminals that are operable by a user such as a smartphone, a tablet terminal, a mobile phone, and a PC, for example. An MFP (multifunction peripheral) and a projector are examples of an electronic device configured to perform electronic data input/output (e.g. printing, scanning, projection). Other examples of the electronic device include a printer, a scanner, a copier, an image display device, and other devices that can perform electronic data input/output.

The MFP is an example of an image forming apparatus. The MFP has an imaging function, an image forming function and a communication function. The MFP may be used as a printer, a facsimile machine, a scanner, and a copier, for example. The projector is an example of an image projection apparatus. The projector has a projection function and a communication function.

The client device 30A may access the information management apparatus 10 via the network N1. The client device 30B may access the information management apparatus 10 via the network N1 by establishing wireless connection with the access point 40.

Note that when a firewall (FW) is arranged between the network N1 and the network N2, for example, the client device 30C may be unable to directly access the information management apparatus 10. Accordingly, the client device 30C is configured to indirectly access the information management apparatus 10 using the relay server 50. That is, the client device 30C transmits an access request for accessing the information management apparatus 10 to the relay server 50. The information management apparatus 10 periodically accesses the relay server 50 to receive the access request from the client device 30C.

Note that the term "client device 30" may be used below to refer to any one of the client devices 30A-30C. Note that methods of accessing the information management apparatus 10 and the client terminals 30A-30C may vary as described above. However, the access methods are not particularly distinguished in the descriptions below.

The information management device 10 can be implemented by a storage server, for example. The information management apparatus 10 centrally manages access from the client device 30 to the file server 20. Note that in the information processing system 1 illustrated in FIG. 1, the information management apparatus 10 and the file server 20 are arranged within the same network N1. However, the file server 20 may alternatively be arranged outside the network N1 provided the information management apparatus 10 and the file server 20 are able to access each other.

The client device 30 accesses the information management apparatus 10 to acquire information such as a file stored in the information management apparatus 10 as well as information such as a file stored in the file server 20 as described below.

The information management apparatus 10 mediates access and operations from the client device 30 to the file server 20 (e.g. downloading/uploading files). In this way, user operations may be reduced as described below, and user convenience may be improved as a result.

The information management apparatus 10 is an example of an information processing apparatus. The information management apparatus 10 may execute a sophisticated process that cannot be executed at the client device 30 or a process as a storage server, for example. The information management apparatus 10 may cooperate with an operation terminal such as a smartphone or a tablet terminal to provide services relating to electronic data input/output by an electronic device such as an MFP or a projector, for example. Note that the information management device 10 may be configured by multiple computers. The file server 20 may be another example of an information processing apparatus.

<Hardware Configuration>

Figure 2:
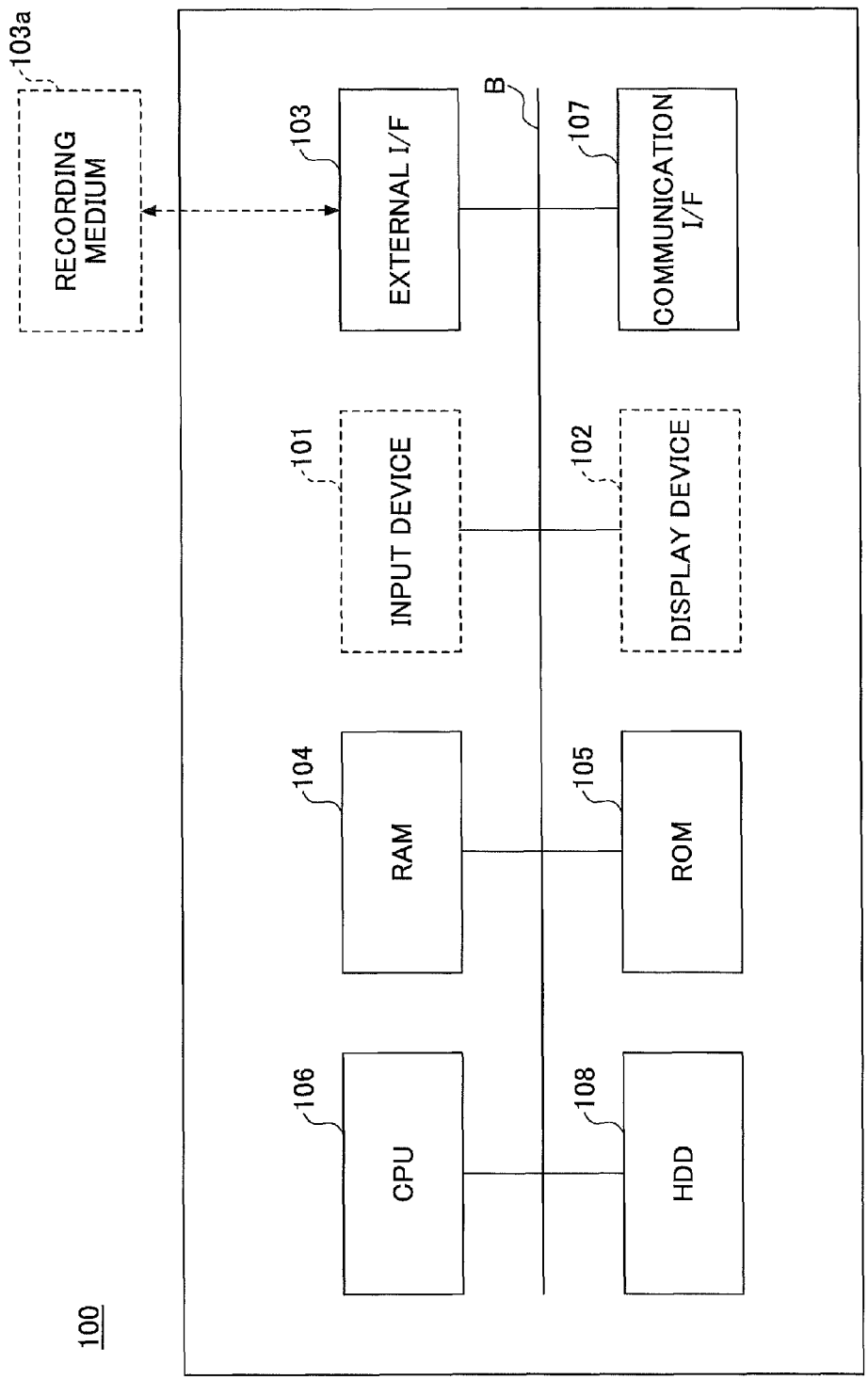
FIG. 2 illustrates an exemplary hardware configuration of a computer according to an embodiment of the present invention.

The information management apparatus 10 may be implemented by a computer having a hardware configuration as illustrated in FIG. 2, for example. FIG. 2 illustrates an exemplary hardware configuration of a computer 100 according to the present embodiment.

The computer 100 illustrated in FIG. 2 includes an input device 101, a display device 102, an external I/F 103, a RAM 104, a ROM 105, a CPU 106, a communication I/F 107, and a HDD 108 that are interconnected by a bus B. Note that in some embodiments, the input device 101 and the display device 102 may be connected to the computer 100 as is necessary, for example.

The input device 101 may include a keyboard and a mouse, for example, and is used for inputting various operation signals in the computer 100. The display device 102 includes a display, for example, and is configured to display processing results of the computer 100.

The communication I/F 107 is an interface for establishing connection between the computer 100 and the network N1. In this way, the computer 100 may be able to exchange data over the network N1 via the communication I/F 107.

The HDD 108 is a non-volatile storage device storing programs and data. The stored programs and data may include an OS (Operating System), which is basic software for controlling overall operations of the computer 100, and application programs for providing various functions on the OS, for example.

The external I/F 103 acts as an interface between the computer 100 and an external device. An example of an external device is a recording medium 103a. The computer 100 may read data from the recording medium 103a or write data on the recording medium 103a via the external I/F 103. Specific examples of the recording medium 103a include a flexible disk, a CD, a DVD (Digital Versatile Disk), an SD memory card, and a USB (Universal Serial Bus) memory.

The ROM 105 is a non-volatile semiconductor memory (storage device) that is capable of retaining programs and data even when the power is turned off. The ROM 105 stores programs and data such as BIOS (Basic Input/Output System) that is executed when the computer system 100 is activated, OS settings, and network settings. The RAM 104 is a volatile semiconductor memory (storage device) for temporarily storing programs and data.

The CPU 106 is a processor for implementing overall control and functions of the computer 100 by loading programs and data into the RAM 104 from storage devices such as the ROM 105 and the HDD 108, and executing processes.

The computer 100 according to the present embodiment may implement various processes described below through the cooperation of hardware resources, programs, and data, for example.

<Software Configuration>

In the following, a description is given of the information processing system 1 in which the information management device 10 implements a storage server 10A. Note that in the example described below, image data and print data are stored as file data in a file server 20. The storage server 10A according to the present embodiment may implement processes as illustrated in FIG. 3, for example.

Figure 3:
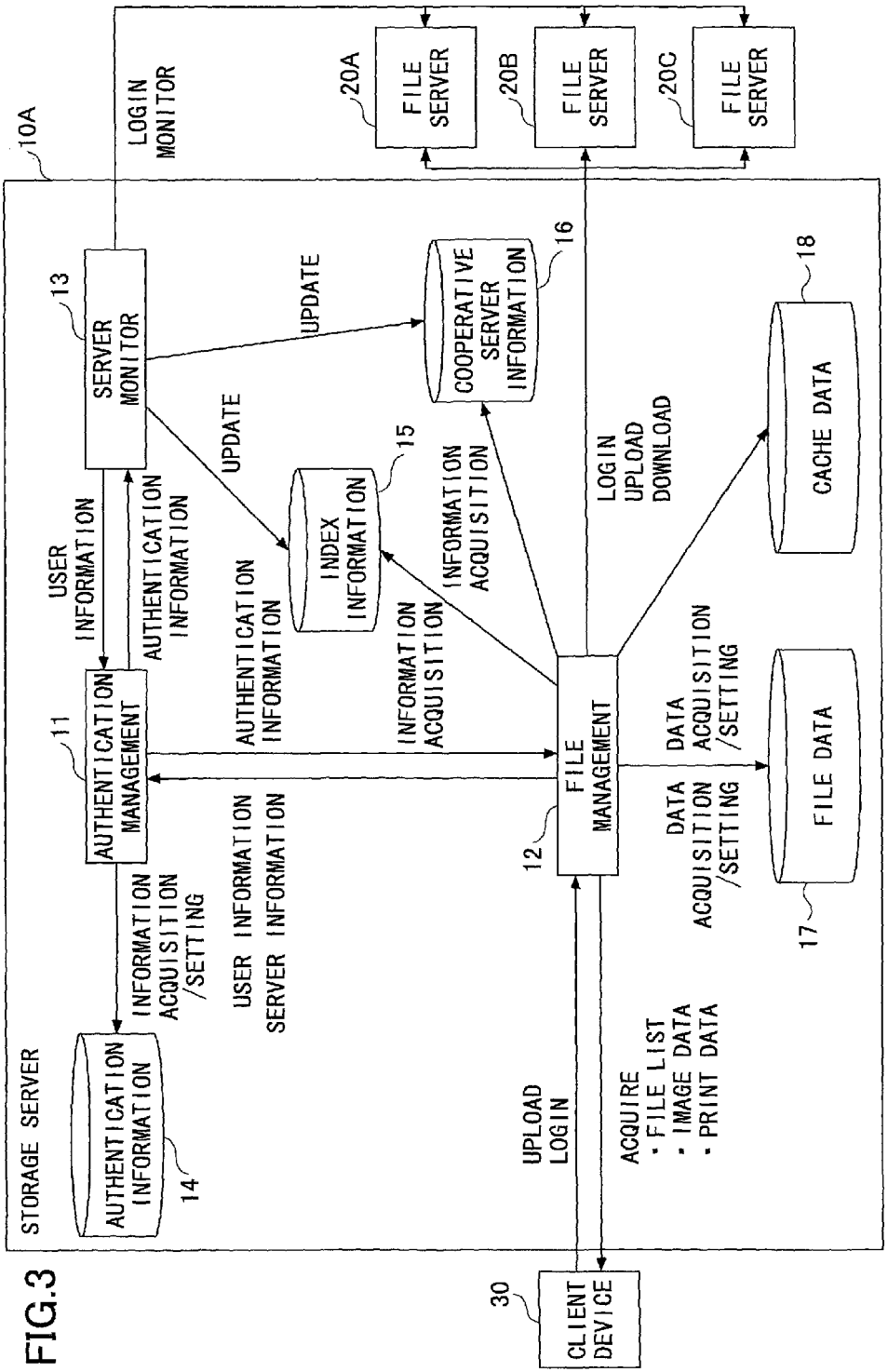
FIG. 3 is a block diagram illustrating exemplary processes implemented by a storage server according to an embodiment of the present invention.

FIG. 3 is a block diagram illustrating exemplary processes implemented by the storage server 10A according to the present embodiment. The storage server 10A may execute relevant programs to implement an authentication management unit 11, a file management unit 12, a server monitor unit 13, an authentication information storage unit 14, an index information storage unit 15, a cooperative server information storage unit 16, a file data storage unit 17, and a cache data storage unit 18.

The authentication management unit 11 manages authentication information for enabling the client device 30 to access the storage server 10A, and authentication information for enabling the storage server 10A to access the file server 20. The file management unit 12 uses index information of file data stored in the file server 20 to manage the file data stored in the file server 20. Note that the file management unit 12 is an exemplary embodiment of an information management unit. The server monitor unit 13 monitors the state of the file server 20 and updates the index information and cooperative server information. Note that the server monitor unit 13 is an exemplary embodiment of a storage location monitor unit.

The authentication information storage unit 14 stores authentication information for enabling the client device 30 to access the storage server 10A, and authentication information for enabling the storage server 10A to access the file server 20.

The index information storage unit 15 stores the index information of file data stored in the file server 20. The cooperative server information storage unit 16 stores server information of the file server 20 that cooperates with the storage server 10A.

The file data storage unit 17 stores file data in the storage server 10A. Note that the file management unit 12 uses the index information of the file data stored in the file data storage unit 17 to manage the file data stored in the file data storage unit 17 as well as the file data stored in the file server 20. The cache data storage unit 18 stores cache data.

Figure 4:
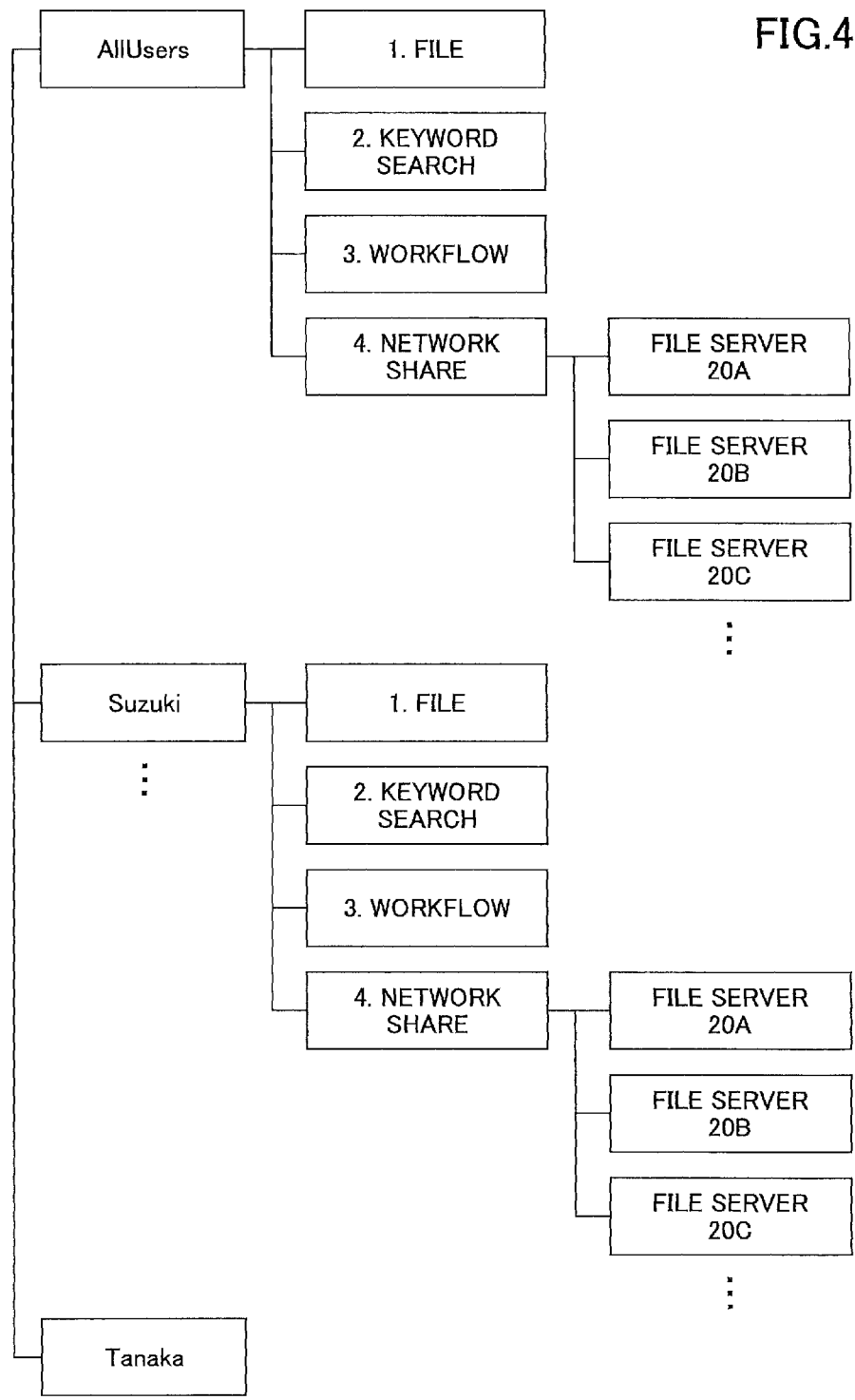
FIG. 4 illustrates an exemplary folder configuration shared by the storage server.

FIG. 4 illustrates an exemplary folder configuration of folders shared by the storage server 10A. The folder configuration of FIG. 4 includes an AllUsers folder that is shared by all users that can access the storage server 10A and personal folders that are each accessible by a specific user and are represented by a specific user name such as "Suzuki" and "Tanaka".

The AllUsers folder and the personal folders of FIG. 4 each include a file folder, a keyword search folder, a workflow folder, a network share folder. The file folder is a folder for storing file data that a user wishes to store or share. The keyword search folder searches for file data including a keyword from file data stored in the storage server 10A and the file server 20 that has been set up. The keyword may be created within the keyword search folder, for example. The file data to be searched may be file data with a file name including the keyword or file data having the keyword in its full text, for example. Also, the keyword search folder may perform a refined search by creating a subfolder, for example.

The workflow folder is a folder that has a specific function. File data arranged in the workflow folder is converted into a predetermined data format and is placed under the file folder. The network share folder displays file data that is stored in the file server 20 that has been set up.

As can be appreciated, the storage server 10A may have both the AllUsers folder and the personal folders display file data stored in the file server 20 that has been set up.

<Process Details>
In the following, processes of the information processing system 1 according to the present embodiment are described in greater detail.

Figure 5:
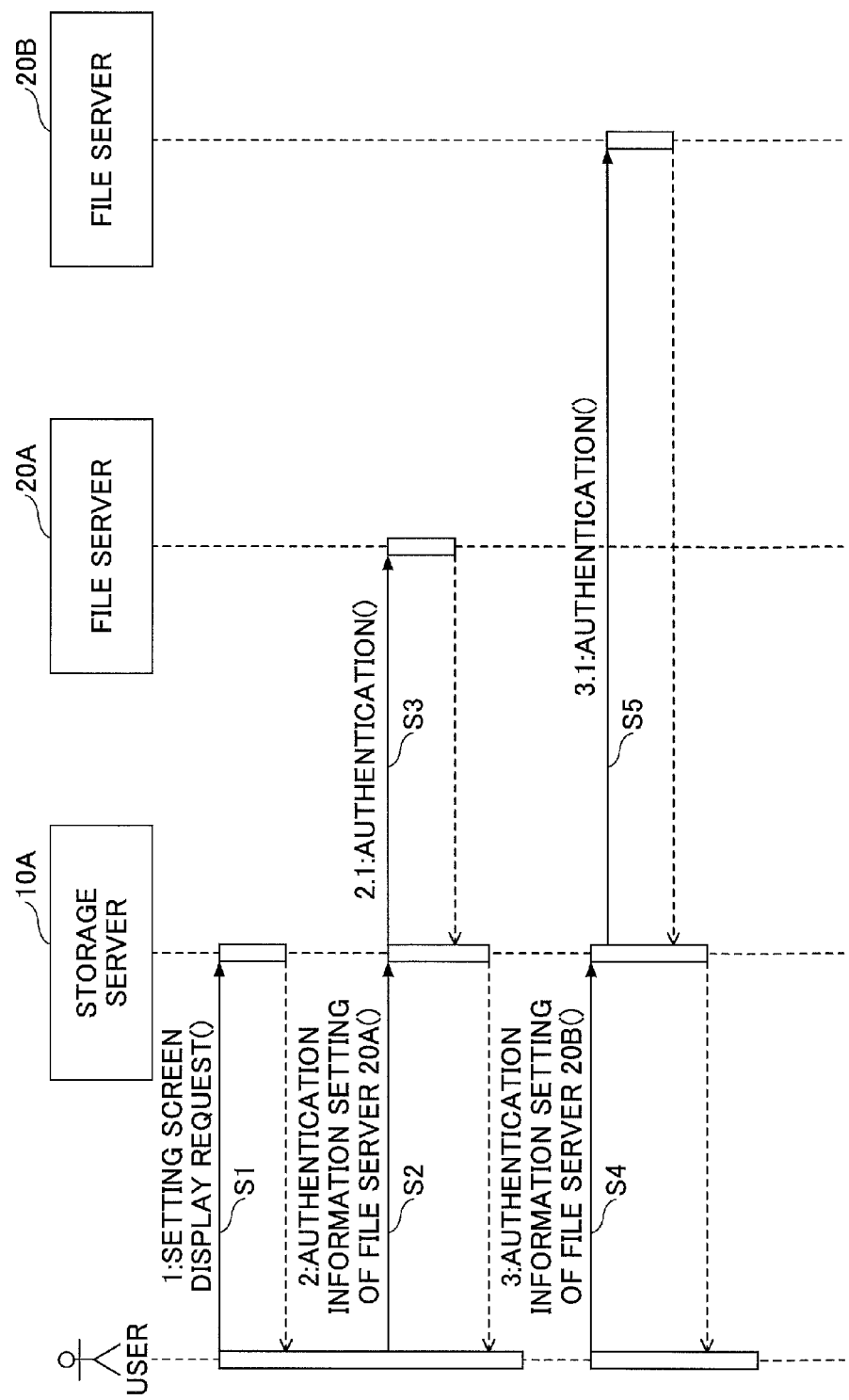
FIG. 5 is a sequence chart illustrating an exemplary file server registration process of the information processing system.

<<File Server Registration Process>>
A file server registration process for registering the file server 20 that cooperates with the storage server 10A may be implemented by process steps as illustrated in FIG. 5, for example. FIG. 5 is a sequence chart illustrating an exemplary file server registration process of the information processing system 1 according to the present embodiment.

In step S1, a user issues a setting screen display request to the storage server 10A to have the setting screen displayed at the storage server 10A. Note that in the following, an exemplary case of registering the file server 20A and the file server 20B is described.

In step S2, the user sets up authentication information of the file server 20A in the setting screen that has been displayed. In step S3, the storage server 10A performs authentication of the file server 20A using the authentication information set up in the setting screen, and, if the authentication is successful, the storage server 10A stores the authentication information as correct authentication information in the authentication information storage unit 14.

Also, in step S4, the user sets up authentication information of the file server 20B in the setting screen that has been displayed. In step S5, the storage server 10A performs the authentication of the file server 20B using the authentication information set up in the setting screen and stores the authentication information in the authentication information storage unit 14 as correct authentication information if the authentication is successful.

Note that although the process of setting up the authentication information in the setting screen is divided into steps S2 and S4 in the example illustrated in FIG. 5, the process of setting up the authentication information of the file server 20A and the file server 20B may alternatively be performed all at once in step S2, for example.

By repeating the process sequence as illustrated in FIG. 5, authentication information such as that illustrated in FIG. 6 may be stored in the authentication information storage unit 14, for example. FIG. 6 is a table illustrating an exemplary configuration of authentication information stored in the authentication information storage unit 14.

The authentication information illustrated in FIG. 6 registers storage server authentication information for enabling each user to access the storage server 10A in association with file server authentication information for enabling each user to access each file server 20. The storage server authentication information includes account information (user ID, password) for enabling each user to access the storage server 10A from the client device 30. The file server authentication information includes account information (user ID, password) for enabling each user to access the file server 20 from the storage server 10A. Note that the authentication information illustrated in FIG. 6 registers the authentication information of one storage server 10A in association with the authentication information of one or more file servers 20.

By utilizing the authentication information as illustrated in FIG. 6, the storage server 10A may refer to the authentication information of a user that has accessed the storage server 10A to identify the authentication information of the file server 20 that can be accessed by the user.

Figure 7:
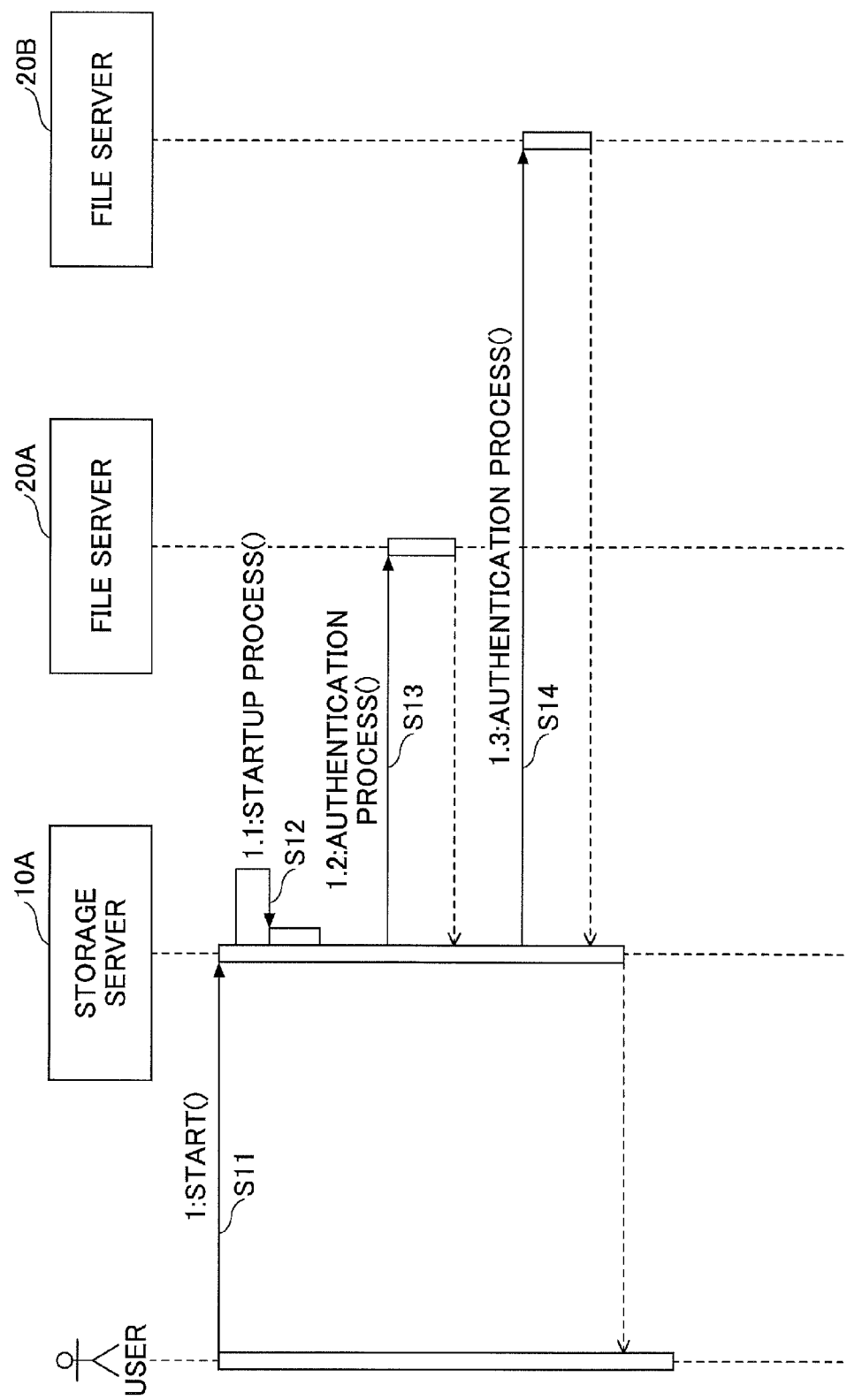
FIG. 7 is a sequence chart illustrating an exemplary storage server startup process of the information processing system.

<<Storage Server Startup Process>>
A storage server startup process for starting the storage server 10A may be implemented by process steps as illustrated in FIG. 7, for example. FIG. 7 is a sequence chart illustrating an exemplary storage server startup process of the information processing system 1 according to the present embodiment.

In step S11, the user makes a request to start the storage server 10A. In step S12, the storage server 10A performs a startup process. After performing the startup process of step S12, the storage server 10A acquires authentication information of the file server 20 stored in the authentication information storage unit 14. In step S13, the storage server 10A performs an authentication process with respect to the file server 20A using the acquired authentication information. In step S14, the storage server 10A performs an authentication process with respect to the file server 20B using the acquired authentication information.

The storage server 10A confirms the existence of one or more file servers 20, and based on successful authentication with respect to the file servers 20A and 20B, for example, the storage server 10A determines the file servers 20 to be displayed in the network share folder under the AllUsers folder.

That is, by performing the storage server startup process of FIG. 7, the file servers 20 that can be accessed by all users having their account information registered in the storage server 10A may be determined. After performing the storage server startup process of FIG. 7, the storage server 10A may log out of the file server 20.

<<Information Acquisition Process>>

Figure 8:
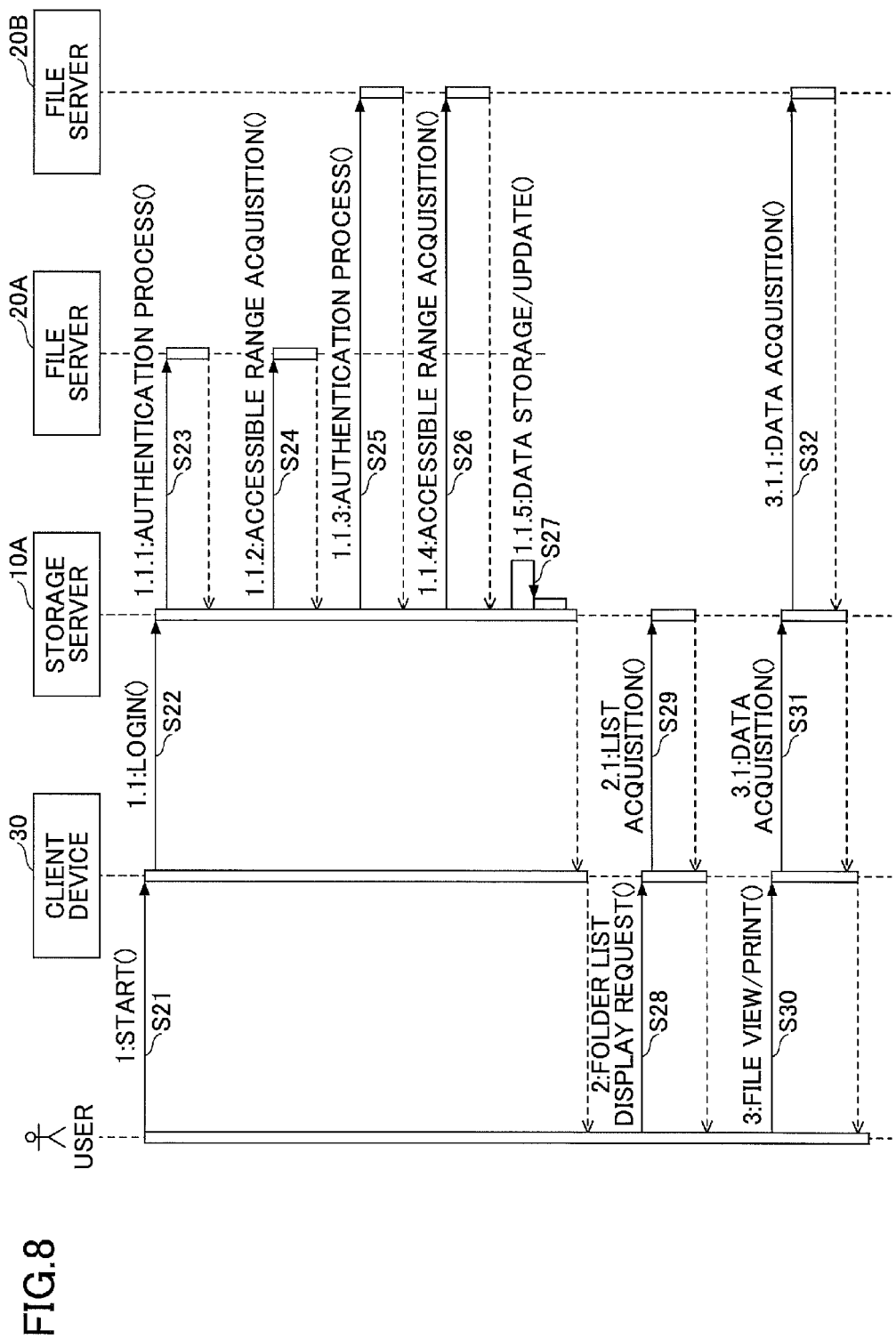
FIG. 8 is a sequence chart illustrating an exemplary information acquisition process of the information processing system.

An information acquisition process for enabling the client device 30 to acquire information from the storage server 10A may be implemented by process steps as illustrated in FIG. 8, for example. FIG. 8 is a sequence chart illustrating an exemplary information acquisition process of the information processing system 1 according to the present embodiment.

In step S21, the user starts the client device 30. The user enters account information for accessing the storage server 10A. In step S22, the client device 30 makes a login request to the storage server 10A based on the account information entered by the user. The storage server 10A starts a login process in response to the login request from the client device 30.

The storage server 10A determines that login is successful if the account information from the client device 30 is stored in the authentication information storage unit 14. In the following descriptions, it is assumed that the login has been successful. If the login has been successful, the storage server 10A acquires from the authentication information storage unit 14 authentication information of the file server 20 associated with the storage server authentication information of the user that has successfully logged in. In other words, the storage server 10A uses account information of the user that has logged into the storage server 10A to identify account information for enabling the logged-in user to access the file server 20.

In step S23, the storage server 10A performs an authentication process with respect to the file server 20A using the account information for enabling the logged-in user to access the file server 20A.

If the authentication is successful, in step S24, the storage server 10A acquires from the file server 20A index information of file data within the accessible range for the logged-in user.

Also, in step S25, the storage server 10A performs an authentication process with respect to the file server 20B using the account information for enabling the logged-in user to access the file server 20B.

If the authentication is successful, in step S26, the storage server 10A acquires from the file server 20B index information of file data within the accessible range for the logged-in user.

In step S27, the storage server 10A uses the index information acquired from the file servers 20A and 20B to update the index information stored in the index information storage unit 15. Also, the storage server 10A uses server information of the file servers 20A and 20B to update the server information stored in the cooperative server information storage unit 16.

FIG. 9 is a table illustrating an exemplary configuration of index information. The index information illustrated in FIG. 9 includes attribute information such as a file server name, a file path, full-text information, an update date/time, a permission, an owner, a group, and a file size, for example. The storage server 10A stores index information as illustrated in FIG. 9 in order to display a list of file data stored in one or more file servers 20. To create the index information, the storage server 10A may periodically access the file servers 20 to search the file data stored therein and update the attribute information accordingly, for example.

Note that in FIG. 9, the file server name of the index information specified as "own storage" indicates that the corresponding file data is stored in the file data storage unit 17 of the storage server 10A.

The full-text information corresponds to text information of a document file in the case where the file data corresponds to a document file. The permission is information relating to authorization to access relevant data. For example, the permission may be described by a character string such as "-rw-r--r-", and the first character may represent the type of data such as a file or a directory. The next three characters may represent access authority of an owner with respect to the relevant data. Of the three characters, a first character "r" may represent reading data (read), a second character "w" may represent writing data (write), and a third character "x" may represent execution of the data. Note that if the owner is not authorized to perform one or more of the above processes, the symbol "-" may be indicated in the corresponding character position. The next three characters following the three characters representing the access authority of the owner may represent access authority of a group with respect to the relevant data. The next three characters following the three characters representing the access authority of the group may represent access authority of other users with respect to the relevant data. Note that the specific information represented by the three characters describing the access authority of the group and the other users may be the same as the three characters representing the access authority of the owner.

For example, with respect to the permission described as "-rw-r--r-", access authority may be interpreted as follows. First, the relevant data is stored as a file, and the owner is authorized to read and write the data but is not authorized to execute the data. A user belonging to the relevant group is authorized to read the data but is not authorized to write or execute the data. Other users are authorized to read the data but are not authorized to write or execute the data.

Referring back to FIG. 9, the owner and the group are information indicating the owner and the group described above in connection with the permission.

In step S28, the user operates the client device 30 to request for the display of a folder list. In step S29, the client device 30 makes a folder list acquisition request to the storage server 10A.

The storage server 10A that receives the folder list acquisition request from the client device 30 performs a folder list creation process, which is described in detail below. The storage server 10A then sends the created folder list to the client device 30. In turn, the client device 30 displays the received folder list. In this way, the user may check the folder list displayed by the client device 30. Note that the folder list referred to in the present embodiment may include files as well as folders, for example.

Figure 10:
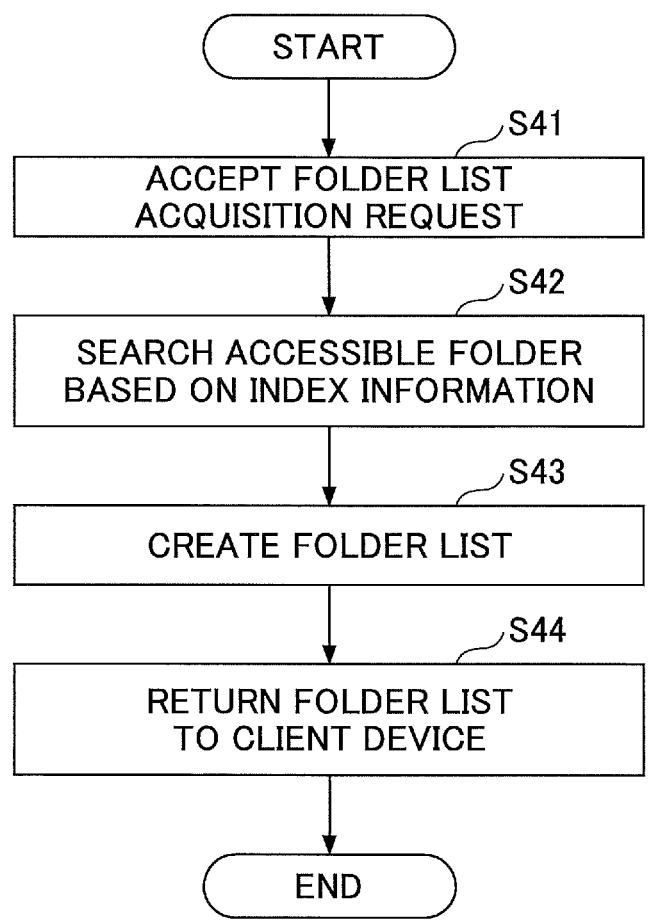
FIG. 10 is a flowchart illustrating exemplary process steps of a folder list creation process of the storage server.

FIG. 10 is a flowchart illustrating an exemplary folder list creation process implemented by the storage server according to the present embodiment. In step S41, the storage server 10A accepts a folder list acquisition request from the client device 30.

In step S42, the storage server 10A refers to the index information stored in the index information storage unit 15 to search for folders and files that can be accessed by the logged-in user.

Note that the folders and files that can be accessed by the logged-in user may include folders and files that can be accessed only by one or more specific users including the logged-in user as well as shared folders and files that are can be accessed by all users. Note that whether a folder or a file can be accessed by the logged-in user may be determined based on the permission associated with each item of data described in FIG. 9, for example.

In step S43, the storage server 10A creates a folder list of folders that can be accessed by the logged-in user based on the search results of step S42. Then, in step S44, the storage server 10A returns the folder list created in step S43 to the client device 30.

The client device 30 that has received the folder list may display a folder list display as illustrated in FIGS. 11A-11D, for example. FIGS. 11A-11D illustrate examples of a folder list display.

Note that FIGS. 11A-11D illustrate folder list displays that may be displayed in an exemplary case where file A and file D are stored in the file server 20A, file C is stored in the file server 20B, and file B and file E are stored in the file server 20C.

Figure 11D:
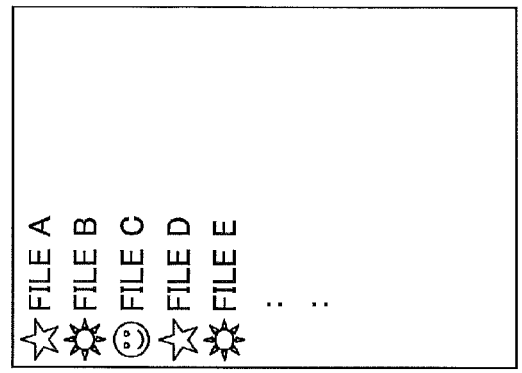
FIGS. 11A-11D illustrates examples of a folder list display.
Figure 11C:
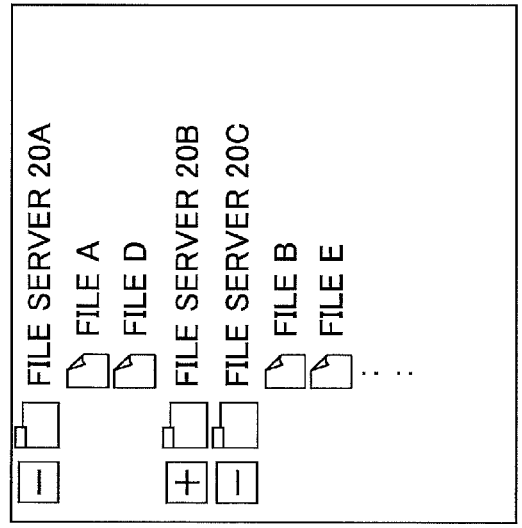
Figure 11B:
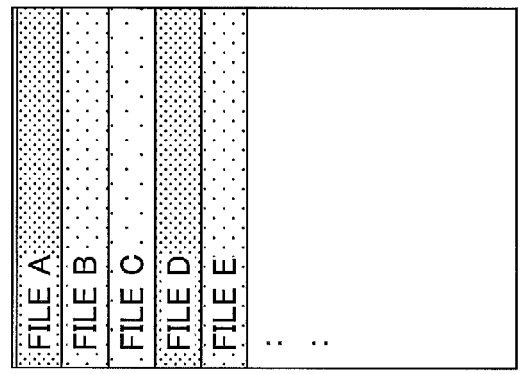
Figure 11A:
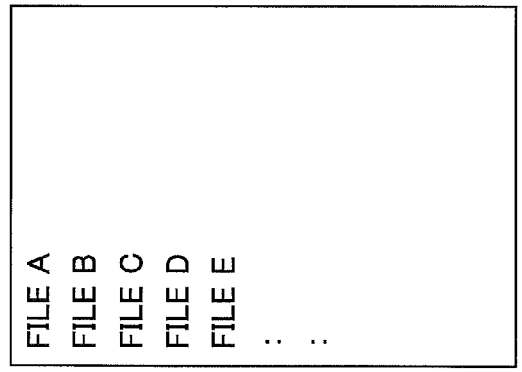

In FIG. 11A, the files A-E are listed in parallel. In FIG. 11B, the files A-E are listed under the file server 20 in which they are stored. In FIG. 11C, the files A-E are listed in parallel and displayed in different colors according to the file server 20 in which they are stored.

In FIG. 11D, all the files A-E are listed in parallel, and different icons are displayed next to the files A-E according to the file server 20 in which they are stored. Note that in a case where the same file is stored in more than one file server 20, the file may be listed as one file when all the files in the folder list are listed in parallel, for example.

Note that whether two or more files stored in different file servers 20 correspond to the same file may be determined based on whether their file names match, for example. Also, the determination of whether two or more files correspond to the same file may be made based on whether their full-text information included in their index information match, for example. Further, the determination of whether two or more files correspond to the same file may be made based on whether their file names and their full-text information included in their index information match, for example.

Referring back to FIG. 8, in step S30, the user selects a file that the user wishes to view or print out from the files listed and displayed in the folder list displayed by the client device 30, and issues a corresponding instruction for viewing/printing the selected file, for example.

In step S31, the client device 30 sends a data acquisition request to the storage server 10A for acquiring file data of the file for which an instruction such as a view/print instruction has been issued by the user. In step S32, the storage server 10A acquires the file data from the file server 20B, for example, in which the file data requested by the user is stored. Then, the storage server 10A returns the acquired file data to the client device 30.

<Summary>

According to an aspect of the information processing system 1 according to the present embodiment, when a user wishes to perform an operation with respect to a file stored in the storage server 10A or the file server 20, the user does not have to perform different operations according to the storage location of the file and user convenience may be improved as a result.

According to another aspect of the information processing system 1 of the present embodiment, folders and files stored in the storage server 10A and a plurality of file servers 20 may be integrally listed and presented to the user. Thus, the user may perform operations on the files through common procedures regardless of the storage location of the files.

Second Embodiment

In the following, a second embodiment of the present invention is described. Note that features of the second embodiment that may be identical to those of the first embodiment are given the same reference numerals and their descriptions may be omitted.

As illustrated in FIG. 8, in the first embodiment, the authentication process with respect to the file server 20 is performed at the time the user starts the client device 30. In the second embodiment of the present invention, the authentication process with respect to the file server 20 is performed at the time the user performs an operation to acquire file data from the file server 20. Note that in the following descriptions, it is assumed that the storage server 10A acquires index information from the file server 20 upon being started and at predetermined time intervals thereafter, for example, and updates the index information stored in the index information storage unit 15 accordingly.

Figure 12:
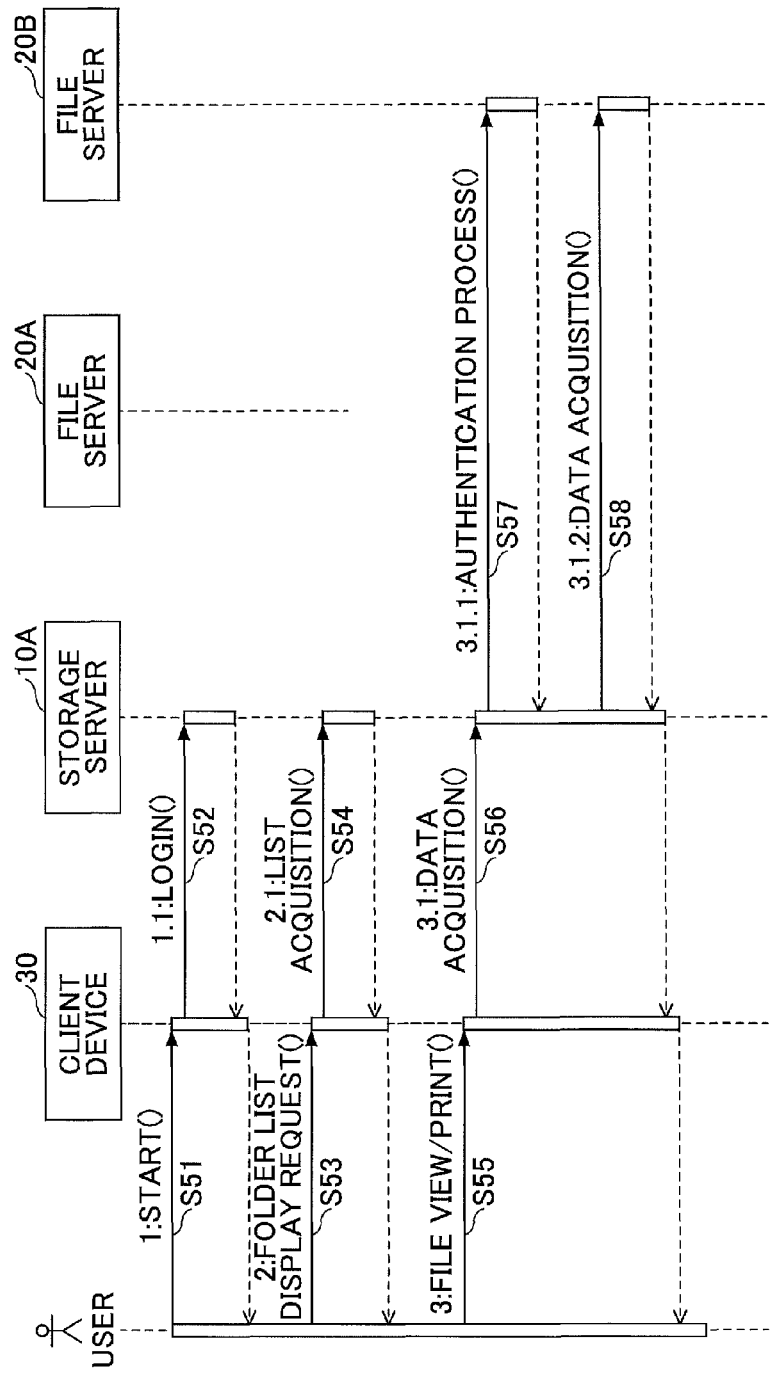
FIG. 12 is a sequence chart illustrating another example of an information acquisition process of the information processing system according to an embodiment of the present invention.

FIG. 12 is a sequence chart illustrating another exemplary information acquisition process according to the second embodiment.

In step S51, the user starts the client device 30. The user enters account information for accessing the storage server 10A. In step S52, the client device 30 makes a login request to the storage server 10A for logging into the storage server 10A using the account information entered by the user. The storage server 10A starts a login process in response to the login request from the client device 30.

The storage server 10A determines that login is successful if the account information from the client device 30 is stored in the authentication information storage unit 14. In the following descriptions, it is assumed that the login has been successful.

In step S53, the user operates the client device 30 to make a request for the display of a folder list. In step S54, the client device 30 sends a folder list acquisition request to the storage server 10A.

The storage server 10A that receives the folder list acquisition request from the client device 30 performs a folder list creation process. The storage server 10A then sends the created folder list to the client device 30. In turn, the client device 30 displays the folder list received from the storage server 10A.

In step S55, the user selects a file that the user wishes to view/print from the files that are listed and displayed in the folder list displayed by the client device 30, and issues a corresponding instruction for viewing/printing the selected file to the client device 30. In step S56, the client device 30 makes a data acquisition request to the storage server 10A for acquiring file data of the file for which an instruction such as a view/print instruction has been issued by the user.

In step S57, the storage server 10A performs an authentication process with respect to the file server 20B, for example, using the account information for enabling the user to access the file server 20B that stores the file data for which the view/print instruction has been issued.

If the authentication is successful, the process proceeds to step S58 in which the storage server 10A acquires the file data requested by the user from the file server 20B. The storage server 10A then returns the acquired file data to the client device 30.

<Summary>

According to an aspect of the information processing system 1 of the second embodiment, advantageous effects similar to those obtained in the first embodiment may be obtained even when the authentication process with respect to the file server 20 is performed at the time the user performs an operation for acquiring file data from the file server 20.

Third Embodiment

In the following, a third embodiment of the present invention is described. Note that features of the third embodiment that may be identical to those of the first embodiment are given the same reference numerals and their descriptions may be omitted.

The first and second embodiments relate to an exemplary case in which an information acquisition process is performed by one user. The third embodiment relates to an exemplary case in which multiple users perform the information acquisition process.

In the information processing system 1 according to the present embodiment, a session between the storage server 10A and the file server 20 may be limited to one session in some cases. In the case where the session between the storage server 10A and the file server 20 is limited to one session in the information processing system 1, the following process operations may be executed when information acquisition processes by multiple users overlap.

Figure 13:
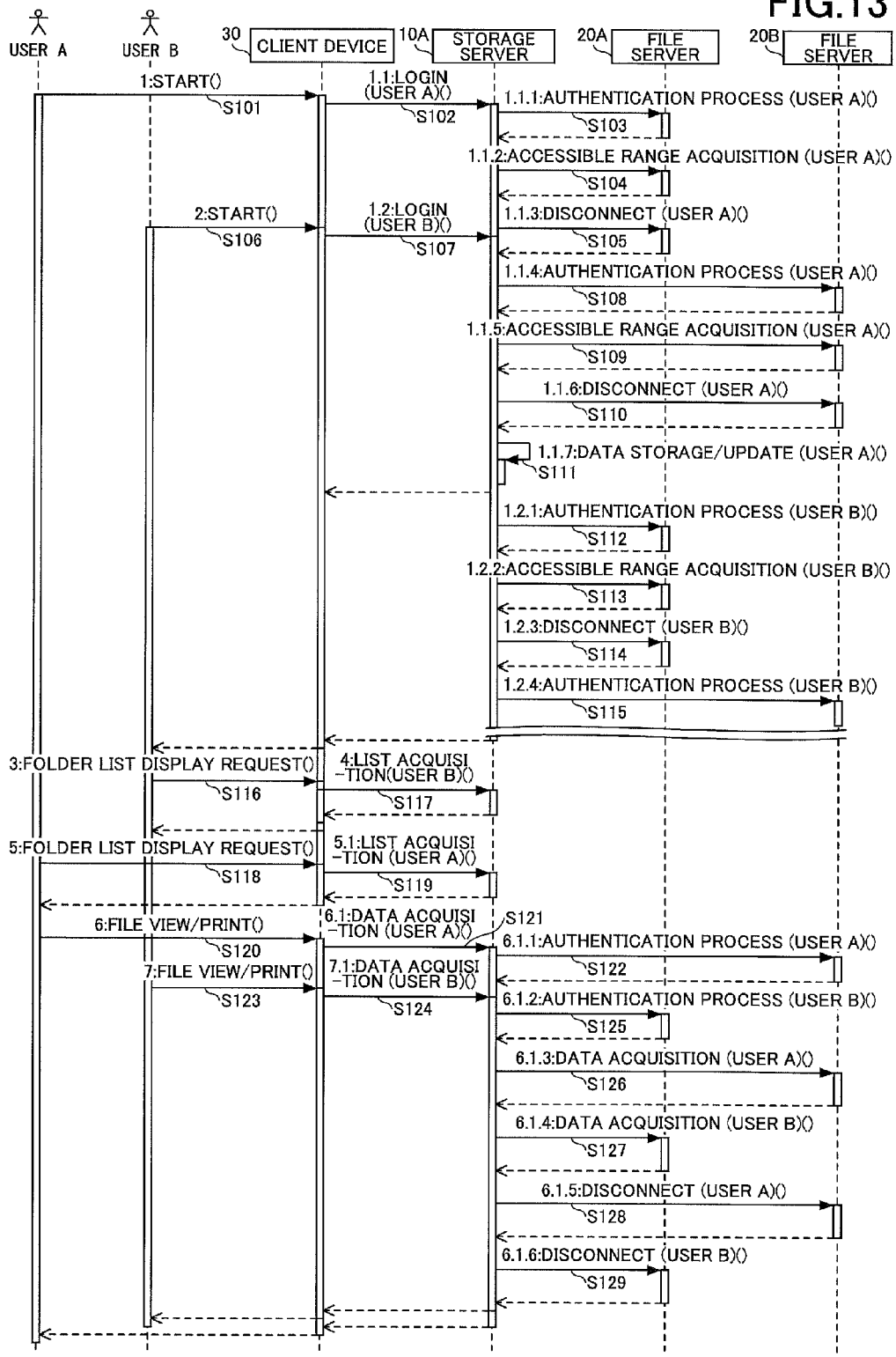
FIG. 13 is a sequence chart illustrating another example of an information acquisition process of the information processing system according to an embodiment of the present invention.

FIG. 13 is a sequence chart illustrating another exemplary information acquisition process of the information processing system 1 according to the third embodiment. Note that in the following descriptions, it is assumed that process operations from starting the client device 30 to acquiring file data performed by user A and user B partially overlap. Note, also, that although only one client device 30 is illustrated in FIG. 13, it is assumed that a client device 30 for the user A and a client device 30 for the user B are provided.

In step S101, the user A starts the client device 30. The user A enters account information for accessing the storage server 10A. In step S102, the client device 30 makes a request to log into the storage server 10A using the account information entered by the user A. The storage server 10A starts a login process in response to the login request from the client device 30 that has been started by the user A.

The storage server 10A determines that login is successful if the account information used in the login request from the client device 30 that has been started by the user A is stored in the authentication information storage unit 14. In the following descriptions, it is assumed that the user A has successfully logged into the storage server 10A. If the login has been successful, the storage server 10A acquires from the authentication information storage unit 14 authentication information for accessing the file server 20 associated with authentication information of the user A that has successfully logged into the storage server 10A. In other words, the storage server 10A refers to the account information of the user A that has logged into the storage server 10A to identify the account information for enabling the user A to access the file server 20.

In step S103, the storage server 10A performs the authentication process with respect to the file server 20A using the account information for enabling the logged-in user A to access the file server 20A. If the authentication is successful, in step S104, the storage server 10A acquires from the file server 20A index information of file data that is within the accessible range for the user A. In step S105, the storage server 10A disconnects the connection (session) with the file server 20A.

In step S106, the user B starts the client device 30. The user B enters account information for accessing the storage server 10A. In step S107, the client device 30 makes a request to login into the storage server 10A using the account information entered by the user B. Note that the storage server 10A starts a login process for the user B after completing the login process and authentication processes for the user A.

In step S108, the storage server 10A performs an authentication process with respect to the file server 20B using the account information for enabling the logged-in user A to access the file server 20B. If the authentication is successful, in step S109, the storage server 10A acquires from the file server 20B index information of file data that is within the accessible range for the user A. In step S110, the storage server 10A disconnects the connection (session) with the file server 20B.

In step S111, the storage server 10A uses the index information obtained from the file server 20A and the file server 20B to update the index information stored in the index information storage unit 15. Also, the storage server 10A updates the server information stored in the cooperative server information storage unit 16 using the server information of the file servers 20A and 20B.

After the authentication processes for the user A has been completed, in step S112, the storage server 10A starts a login process for the user B in response to the login request from the client device 30 that has been started by the user B. Note that the login process and authentication processes for the user B may be similar to the login process and the authentication processes for the user A as described above, and therefore, descriptions thereof are omitted.

In step S116, the user B operates the client device 30 make a request for the display of a folder list. In step S117, the client device 30 of the user B sends a folder list acquisition request to the storage server 10A. The storage server 10A that receives the folder list acquisition request from the client device 30 of the user B performs a folder list creation process. The storage server 10A then sends the created folder list to the client device 30 of the user B. Then, the client device 30 of the user B displays the folder list received from the storage server 10A. In this way, the user B can check the folder list displayed by the client device 30.

In step S118, the user A operates the client device 30 to make a request for the display of a folder list. In step S119, the client device 30 of the user A sends a folder list acquisition request to the storage server 10A. The storage server 10A that receives the folder list acquisition request from the client device 30 of the user A performs a folder list creation process. The storage server 10A then sends the created folder list to the client device 30 of the user A. Then, the client device 30 of the user A displays the folder list received from the storage server 10A. In this way, the user A can check the folder list displayed by the client device 30.

In step S120, the user A selects a file that the user A wishes to view/print from files listed and displayed in the folder list that is displayed by the client device 30 of the user A, and issues a corresponding instruction for viewing/printing the selected file. In step S121, the client device 30 of the user A makes a data acquisition request to the storage server 10A for acquiring file data of the file for which the view/print instruction has been issued by the user A.

In step S122, the storage server 10A performs an authentication process with respect to the file server 20B, for example, that stores the file data for which the view/print instruction has been issued using the account information of the user A for accessing the file server 20B.

In step S123, the user B selects a file that the user B wishes to view/print from files listed and displayed in the folder list that is displayed by the client device 30 of the user B, and issues a corresponding instruction for viewing/printing the selected file. In step S124, the client device 30 of the user B makes a data acquisition request to the storage server 10A for acquiring file data of the file for which the view/print instruction has been issued by the user B.

In step S125, the storage server 10A performs an authentication process with respect to the file server 20A, for example, that stores the file data for which the view/print instruction has been issued using the account information of the user B for accessing the file server 20A.

In the process operations illustrated in FIG. 13, the file data that is subject to the view/print instruction from the user A is different from the file data that is subject to the view/print instruction from the user B, and as such, the data acquisition processes can be performed in parallel. For example, when the authentication process with respect to the file server 20B is successful, in step S126, the storage server 10A acquires the file data requested by the user A from the file server 20B. The storage server 10A returns the acquired file data to the client device 30 of the user A. After step S126, the storage server 10A proceeds to step S128, in which the storage server 10A disconnects the session with the file server 20B.

When the authentication process with respect to the file server 20A is successful, in step S127, the storage server 10A acquires the file data that has been requested by the user B from the file server 20A. The storage server 10A returns the acquired file data to the client device 30 of the user B. After step S127, the storage server 10A process proceeds to step S129 in which the storage server 10A disconnects the session with the file server 20A.

According to the process operation sequence as illustrated in FIG. 13, when the storage server 10A establishes connection with a file server 20 to execute a process, the storage server 10A disconnects the connection after completing the process and moves on to a next process. In this way, parallel processing of processes by a plurality of client devices 30 of a plurality of users may be enabled.

Figure 14:
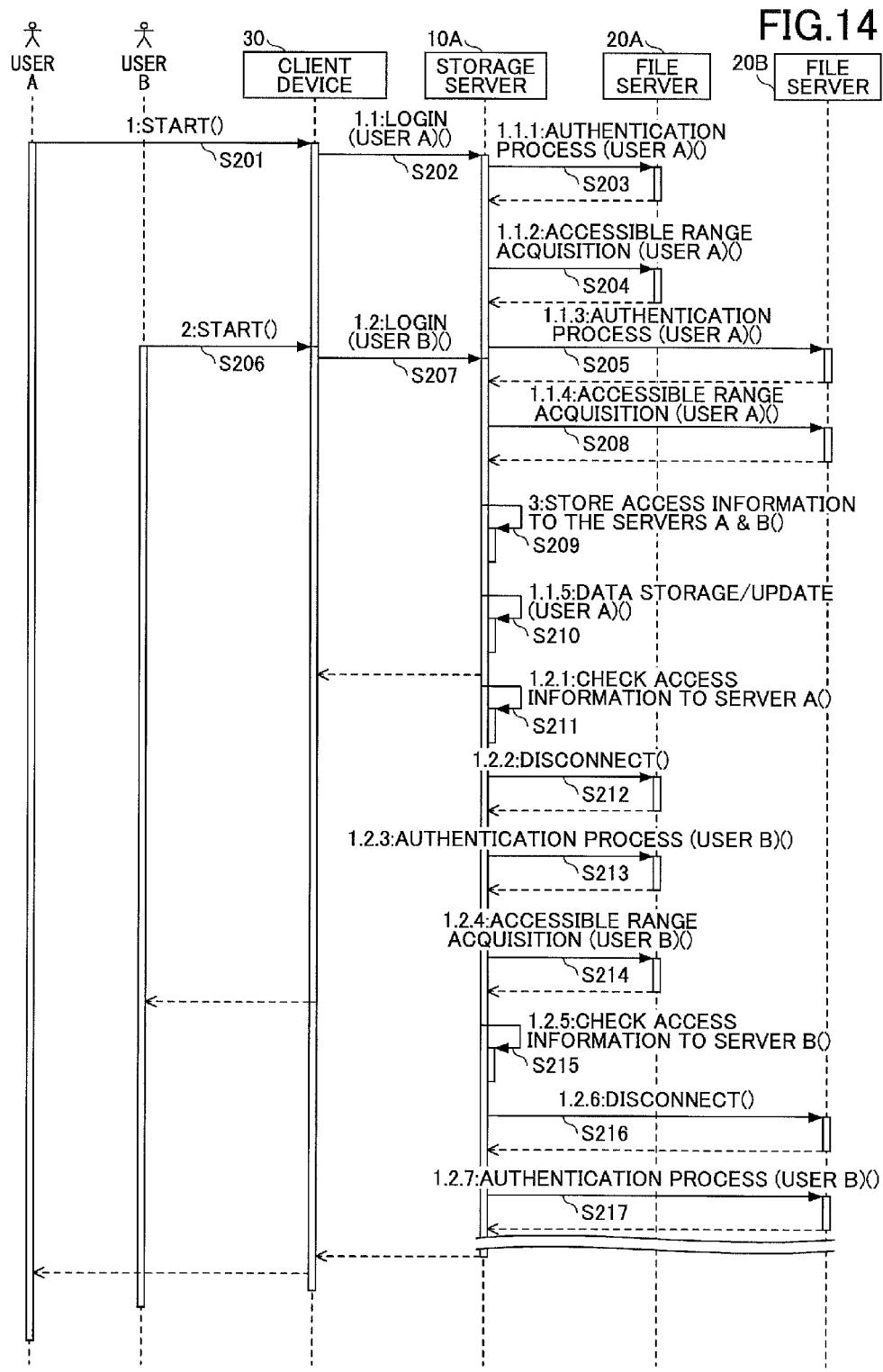
FIG. 14 is a sequence chart illustrating another example of an information acquisition process of the information processing system according to an embodiment of the present invention.

FIG. 14 is a sequence chart illustrating another exemplary information acquisition process of the information processing system 1 according to the present embodiment. Note that in the following descriptions, it is assumed that the process operations from starting the client device 30 until acquiring file data for the user A and the user B partially overlap. Also, note that although only one client device 30 is illustrated in FIG. 14, it is assumed that a client device 30 for the user A and a client device 30 for the user B are provided.

Note that steps S201-S204 of FIG. 14 may be substantially identical to steps S101-S104 of FIG. 13, and accordingly, descriptions thereof are omitted. In FIG. 14, after the storage server 10A acquires from the file server 20A index information of file data that is within the accessible range for the user A in step S204, the storage server 10A does not disconnect the connection with the file server 20A.

Note that the processes of steps S205 and S208 of FIG. 14 may be substantially identical to steps S108 and S109 of FIG. 13, and accordingly, descriptions thereof are omitted. In FIG. 14, after the storage server 10A acquires from the file server 20B index information of file data that is within the accessible range for the user A in step S208, the storage server 10A does not disconnect the connection with the file server 20A.

Note that the processes of steps S206 and S207 of FIG. 14 may be substantially identical to steps S106 and S107 of FIG. 13, and accordingly, descriptions thereof are omitted. In step S209, the storage server 10A maintains the connections with the file servers 20A and 20B and stores access information with respect to the file servers 20A and 20B.

In step S210, the storage server 10A uses the index information acquired from the file server 20A and the file server 20B to update the index information stored in the index information storage unit 15. Also, the storage server 10A updates the server information stored in the cooperative server information storage unit 16 using the server information of the file server 20A and the file server 20B.

After the login process and authentication processes for the user A have been completed, the storage server 10A starts the login process for the user B in response to the login request from the client device 30 that has been started by the user B in step S211. Note that in step S211, the storage server 10A determines whether the login request user corresponds to the user A for which the connections have been maintained in step S209.

When the storage server 10A determines that the login request user corresponds to the user A for which the connections have been maintained in step S209, the storage server 10A uses the maintained connections to establish connection with the file servers 20A and 20B. In the present example, the storage server 10A determines that the login request user does not correspond to the user A for which the connections have been maintained in step S209, and the storage server 10A disconnects the connections before performing an authentication process for enabling the user B to access the file server 20A.

In step S212, the storage server 10A disconnects the connection to the file server 20A. Note that steps S213 and S214 of FIG. 14 may be substantially identical to steps S112 and S113 of FIG. 13, and accordingly, descriptions thereof are omitted.

Also, in step S215, the storage server 10A determines whether the login request user corresponds to the user A for which the connections have been maintained in step S209. In the present example, the storage server 10A determines that the login request user does not correspond to the user A for which the connections have been maintained in step S209, and the storage server 10A disconnects the connections before performing an authentication process for enabling the user B to access the file server 20B.

In step S216, the storage server 10A disconnects the connection to the file server 20B. Note that descriptions of step S217 and subsequent steps are omitted because they may be substantially identical to steps S208-S210 described above.

In the process operation sequence as illustrated in FIG. 14, the storage server 10A maintains the connection established with the file server 20, and if the next access request is made by the same user, the storage server 10A accesses the file server 20 using the connection that has been maintained. If the next access request is made by a different user, the storage server 10A disconnects the connection that has been maintained before performing a process for enabling the different user to access the file server 20.

According to an aspect of the process operation sequence as illustrated in FIG. 14, the processes of establishing connection with the file server 20 and disconnecting the connection by the storage server 10A may be reduced.

Note that as another alternative to the process operation sequences of the information processing system 1 as illustrated in FIGS. 13 and 14, when an authentication process is to be performed between the storage server 10A and the file server 20, the storage server 10A may be configured to disconnect a connection before performing the authentication process with respect to the file server 20. In the information processing system 1 that disconnects a connection before performing an authentication process, the storage server 10A corresponding to the side that establishes a connection is configured to disconnect the connection before performing the authentication process, and in this way, accessing the file server 20 under the authority of another user may be avoided, for example. That is, in the information processing system 1 that disconnects a connection before performing an authentication process with respect to the file server 20, the authentication process may be performed using access information of the corresponding user that is requesting access to the file server 20.

According to an aspect of the information processing system 1 of the third embodiment, even when the timing at which a plurality of users perform operations for acquiring file data overlap with one another, advantageous effects similar to those obtained in the first embodiment may be obtained.

In the following, another embodiment of the present invention directed to a case of cooperating with a cloud server (cloud storage service) is described.

Figure 15:
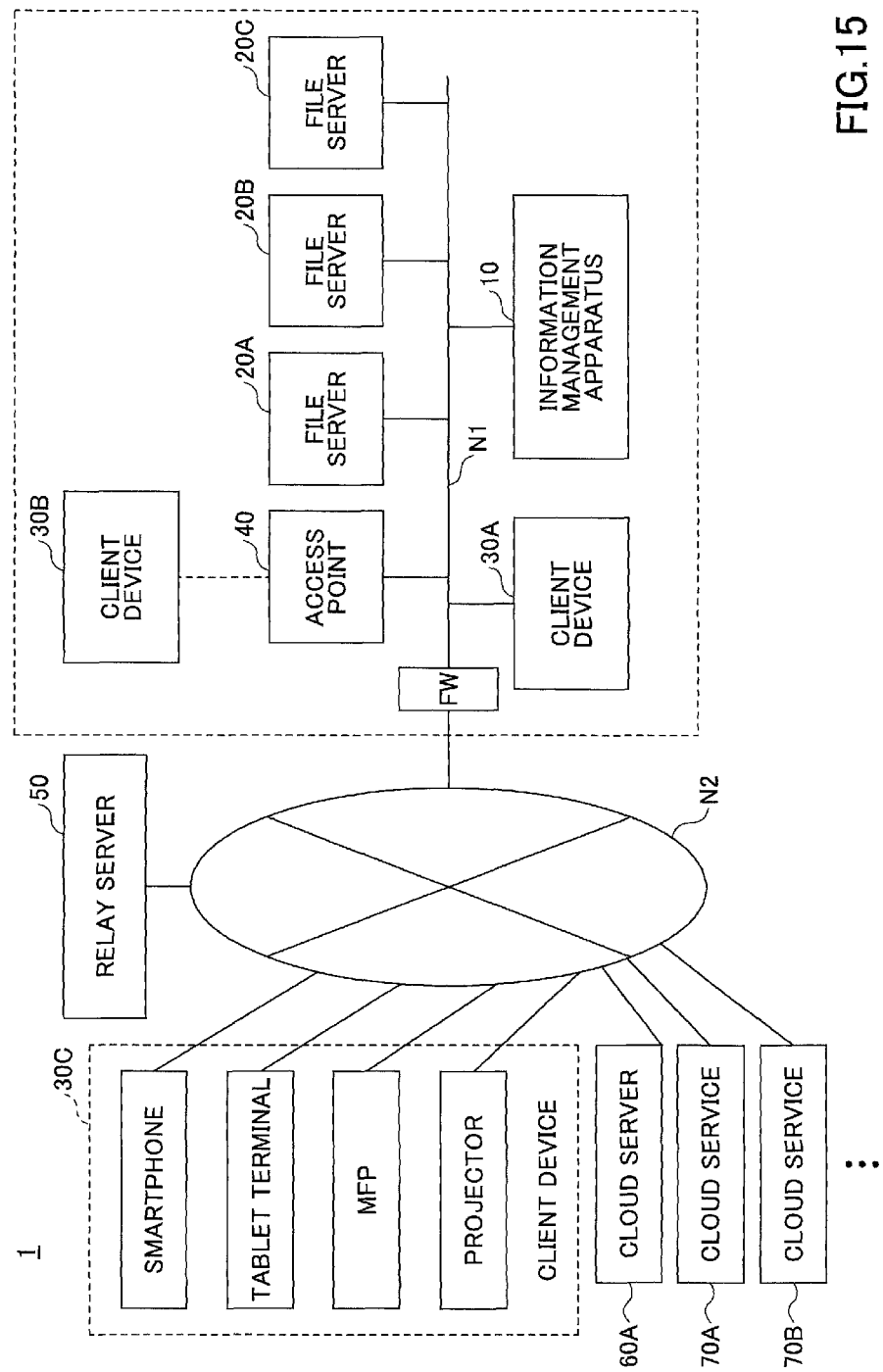
FIG. 15 illustrates another exemplary configuration of the information processing system according to an embodiment of the present invention.

FIG. 15 illustrates an exemplary configuration of the information processing system 1 according to the present embodiment. In FIG. 15, the information processing system 1 includes a cloud server 60A, a cloud service 70A, and a cloud service 70B that are connected to the network N2 in addition to the components illustrated in FIG. 1. Like the file server 20, the cloud server 60A, the cloud service 70A, and the cloud service 70B are capable of storing a file for each user. Also, like the file server 20, the cloud server 60A is only able to allow login access by one user using one account at a given time and cannot allow other users to login at the same time (because a user logs into the server device itself, other users are excluded).

On the other hand, the cloud services 70A and 70B correspond to services that store files in a cloud server, and as such, even if access requests from multiple users are made at the same time, the multiple users may simultaneously access the cloud services 70A and 70B (e.g. while a user A is using the cloud service 70A, another user B may access the cloud service 70A, and the user A and the user B may each be able to use the cloud service 70A). Thus, access control methods are preferably changed with respect to services such as the cloud services 70A and 70B, and server devices such as the cloud server 60A and the file server 20. Note that because a firewall is arranged, access to the cloud server 60A may be made using the relay server 50 (e.g. while periodically polling the relay 50 to determine whether a request has been made to the relay server 50 by the cloud server 60, the storage server 10 may send a request to the relay server 50, and the cloud server 60A may receive from the relay server 50 the request sent from the storage server 10).

Figure 16:
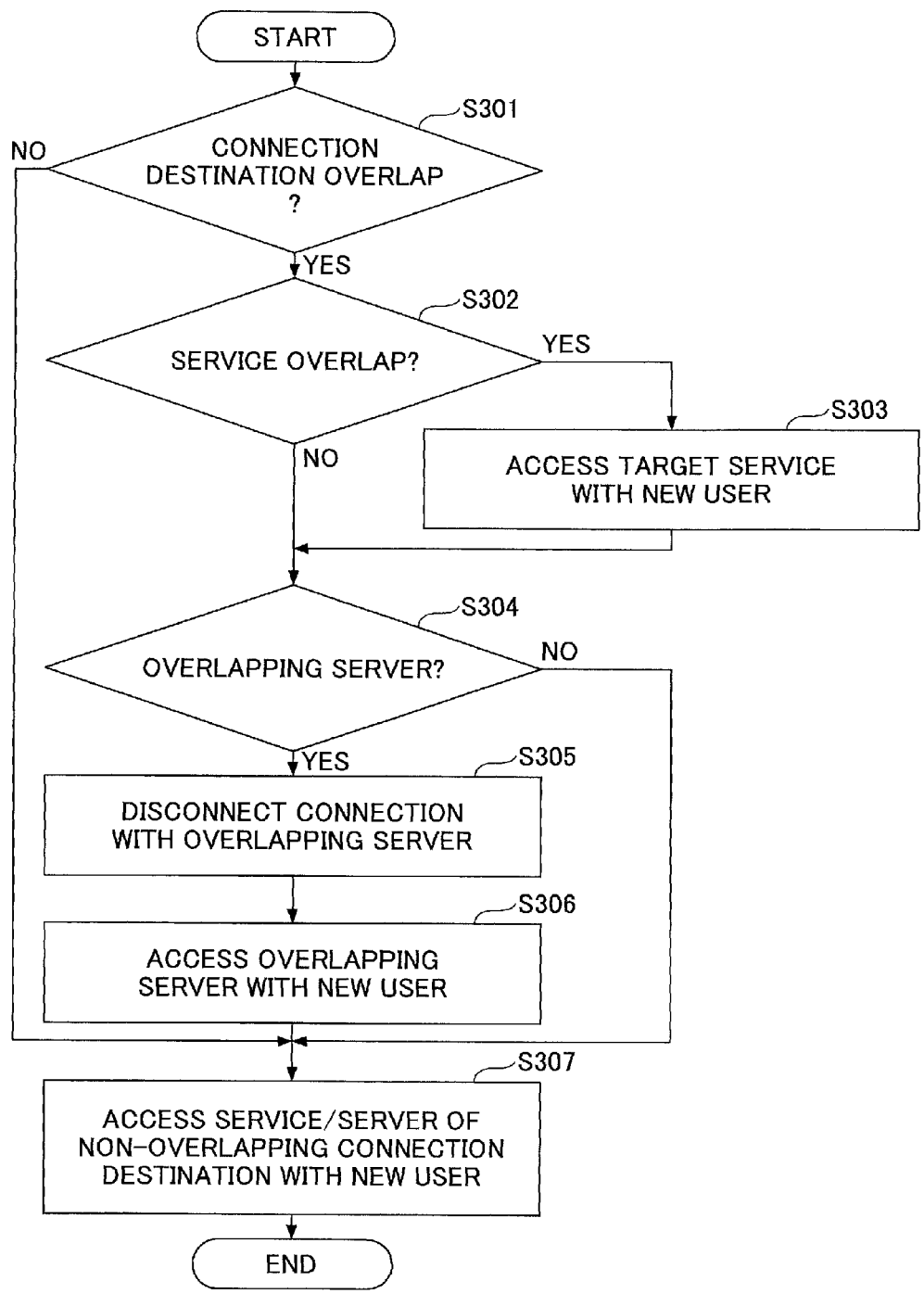
FIG. 16 is a flowchart illustrating exemplary process steps of a connection determination process.

In other embodiments, the storage server 10 may perform a connection determination process as illustrated in FIG. 16 in steps S211-S217 of FIG. 14, for example. In FIG. 16, first, the storage server 10 determines whether there is a connection destination overlap between connectable services and/or server devices for a logged-in user (user B in FIG. 14) and services and/or server devices with which connections are currently established (step S301). For example, assuming authentication information as illustrated in FIG. 17 is stored in the authentication information storage unit 14, the connectable services and server devices for the user A includes "file server A", "file server B", "file server C", and "cloud service B". Accordingly, when the user A logs in, the storage server 10 establishes connections with the file server A, the file server B, the file server C, and the cloud service B. On the other hand, the connectable services and server devices for the user B includes "file server A", "file server C", "cloud server A", and "cloud service B". Accordingly, overlapping connection destinations for user A and user B include "file server A" and "cloud service B".

If there are no overlapping connection destinations (step S301, NO), the storage server 10 does not disconnect the connection with a connection destination (e.g. file server) that is currently established, and accesses services and server devices corresponding to non-overlapping connection destinations using the user ID and password of a newly logged-in user (step S307). If there are overlapping connection destinations (step S301, YES), the storage server 10 determines whether a service such as a cloud service 70 is included in the overlapping connection destinations (step S302). In the example of FIG. 17, the overlapping connection destinations include "cloud service B", accordingly, a positive determination (YES) is made in step S302.

If a service is included in the overlapping connection destinations (step S302, YES), the storage server 10 establishes connection with the service included in the overlapping connection destinations ("cloud service B" in the case of FIG. 17) using the user ID and password of the user B (step S303). Note that when a connection destination corresponds to a service, the service may be accessed simultaneously. Accordingly, the storage server 10 may maintain the connection with the cloud service B using the account information of the user A and additionally establish connection with the cloud service B using the account information of the user B. That is, the storage server 10 may establish connection with the cloud service B using the account information of the user B without disconnecting the connection established with the cloud service B using the account information of the user A. In this way, the storage server 10 may be able to omit reconnection and disconnection processes with respect to the cloud service B.

Then, the storage server 10 determines whether the overlapping connection destinations include a server device (step S304). If a server device is not included in the overlapping connection destinations (step S304, NO), the storage server 10 proceeds to step S307. If the overlapping connection destinations include a server device (step S304, YES), the storage server 10 disconnects the connection with the server device corresponding to the overlapping connection destination ("file server A" in the case of FIG. 17) in a manner similar to the disconnection process described above with reference to FIG. 14 (step S305). Then, the storage server 10 establishes connection with the disconnected server device using the account information of the user B corresponding to the newly logged-in user (step S306). Then, the process proceeds to step S307 where the storage server 10 establishes connections with non-overlapping connection destinations ("file server C" and "cloud server A" in the case of FIG. 17) using the account information of the user B.

Note that although the determination of whether to disconnect a connection is made based on whether an overlapping connection destination corresponds to a service or a server device in the above-described example, the present embodiment is not limited to the above. For example, setting information on whether to disconnect a connection may be set up in advance for each connection destination, and the determination of whether to disconnect a connection may be made based on the setting information.

Although the present invention has been described above with respect to certain illustrative embodiments, the present invention is not limited to the specific embodiments described above, and numerous variations and modifications may be made without departing from the spirit and scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-253154, filed on Dec. 6, 2013 and Japanese Patent Application No. 2014-240835 filed on Nov. 28, 2014, the entire contents of which are hereby incorporated herein by reference.

What is claimed is:

1. An information management method implemented by an information processing apparatus for managing information stored in a storage location, the information management method comprising:

associating first authentication information for authenticating a user to access the information processing apparatus and second authentication information for authenticating the user to access an external storage;

storing the first authentication information and the second authentication information in association with each other in a memory of the information processing apparatus;

authenticating a client device, connected to the information processing apparatus, based on first authentication information transmitted from the client device and the first authentication information stored in the memory; and sending to the client device that has been authenticated, first accessibility information, which indicates electronic data that is stored in a storage other than the client device and that is accessible based on the first authentication information, and second accessibility information, which is acquired based on the second authentication information that is associated with the first authentication information, and identifies electronic data that is stored in the external storage other than the client device and is accessible based on the second authentication information;

wherein the memory stores other first authentication information differing from the first authentication information and other second authentication information differing from the second authentication information in association with each other; and wherein in response to acquiring accessibility information identifying electronic data stored in the external storage that is accessible based on the other second authentication information while accessing the external storage based on the second authentication information, and in response to the external storage being a storage service, the information processing apparatus accesses the external storage using the other second authentication information.

2. An information processing device comprising:
a memory, configured to store a program; and
a processor;
wherein the memory is further configured to store first authentication information for authenticating a user to access the information processing device and second authentication information for authenticating the user to access an external storage, the first authentication information and the second authentication information, being stored in association with each other;

wherein the processor executes the program stored in the memory to perform processes of:

authenticating a client device, connected to the information processing device, based on first authentication information transmitted from the client device and the first authentication information stored in the memory; and sending to the client device that has been authenticated, first accessibility information, which indicates electronic data that is stored in a storage other than the client device and is accessible based on the first authentication information, and second accessibility information, which is acquired based on the second authentication information that is associated with the first authentication information, and identifies electronic data that is stored in the external storage other than the client device and is accessible based on the second authentication information;

wherein the memory stores other first authentication information differing from the first authentication information and other second authentication information differing from the second authentication information in association with each other; and wherein in response to acquiring accessibility information identifying electronic data stored in the external storage that is accessible based on the other second authentication information while accessing the external storage based on the second authentication information, and in response to the external storage being a storage service, the processor accesses the external storage using the other second authentication information.

3. The information processing device of claim 2, wherein the processor acquires the second accessibility information from the external storage when the processor receives a first acquisition request from the client device; and sends the acquired second accessibility information and the first accessibility information to the client device.

4. The information processing device of claim 2, wherein the processor periodically acquires the second accessibility information from the external storage;

stores the acquired second accessibility information in the memory; and sends the stored second accessibility information and the first accessibility information to the client device.

5. The information processing device of claim 2, wherein the memory stores other first authentication information differing from the first authentication information and other second authentication information differing from the second authentication information in association with each other; and in response to acquiring accessibility information identifying electronic data stored in the external storage that is accessible based on the other second authentication information while accessing the external storage based on the second authentication information, and in response to the external storage being a server device, the processor terminates the access being made using the second authentication information, and accesses the external storage using the other second authentication information.

6. The information processing device of claim 2, wherein the memory stores accessibility information, indicating whether each external storage can be accessed using more than one authentication information, in association with each external storage of a plurality of external storages connectable to the information processing device; and in response to acquiring accessibility information identifying electronic data stored in one external storage of the plurality of external storages that is accessible based on the other second authentication information while accessing the one external storage based on the second authentication information, and in response to the accessibility information being stored in association with the one external storage that indicates the one external storage can be accessed using more than one authentication information, the processor accesses the one external storage using the other second authentication information.

7. The information processing device of claim 6, wherein in response to acquiring accessibility information identifying electronic data stored in one external storage of the plurality of external storages that is accessible based on the other second authentication information while accessing the one external storage based on the second authentication information, and in response to the accessibility information being stored in association with the one external storage that indicates the one external storage cannot be accessed using more than one authentication information, the processor terminates the access being made using the second authentication information, and accesses the one external storage using the other second authentication information.

8. The information processing device of claim 2, wherein the processor sends the first accessibility information and the second accessibility information to the client device, and controls the client device to display the first accessibility information and the second accessibility information in different display modes.

9. The information processing device of claim 2, wherein the memory stores, for each user, the first authentication information and a plurality of sets of the second authentication information for authenticating the each user accessing a plurality of different external storages in association with each other; and the processor sends to the client device, the first accessibility information regarding the electronic data accessible based on the first authentication information and the second accessibility information regarding the electronic data stored in the plurality of different external storages that are accessible based on the plurality of sets of the second authentication information that is associated with the first authentication information.

10. The information processing device of claim 9, wherein the processor controls the client device to display the second accessibility information regarding the electronic data stored in the plurality of different external storages accessible based on the plurality of sets of the second authentication information in different display modes based on the external storage of the plurality of different external storages in which the electronic data is stored.

11. The information processing device of claim 2, wherein when accessibility information included in the first accessibility information and the second accessibility information transmitted to the client device is selected at the client device, the processor acquires corresponding electronic data identified by the selected accessibility information from a storage location of the corresponding electronic data; and sends the acquired corresponding electronic data to the client device.

12. A non-transitory computer-readable medium having a computer program recorded thereon that is executable by a processor of an information processing device, the computer program, when executed, enables the information processing device to manage information stored at an external storage location and causes a processor of the information processing device to:

associate first authentication information for authenticating a user to access the information processing device with second authentication information for authenticating the user to access the external storage location;
store the first authentication information in association with the second authentication information in a memory of the information processing device;
authenticate a client device, connected to the information processing device, based on first authentication information transmitted from the client device and the first authentication information stored a memory of the information processing device; and
send, to the client device that has been authenticated, first accessibility information, which indicates electronic data that is stored in a storage other than the client device and is accessible based on first authentication information, and second accessibility information, which is acquired based on second authentication information that is associated with the first authentication information, and identifies electronic data that is stored in the external storage other than the client device and is accessible based on the second authentication information;
wherein the memory stores other first authentication information differing from the first authentication information and other second authentication information differing from the second authentication information in association with each other; and
wherein in response to acquiring accessibility information identifying electronic data stored in the external storage that is accessible based on the other second authentication information while accessing the external storage based on the second authentication information, and in response to the external storage being a storage service, the processor accesses the external storage using the other second authentication information.

* * * * *